United States Patent [19]

Cobb

[11] Patent Number: 5,223,909
[45] Date of Patent: Jun. 29, 1993

[54] HIGH FREQUENCY REFLECTOR ALIGNMENT METHOD

[75] Inventor: Jack M. Cobb, San Juan Capistrano, Calif.

[73] Assignee: Hughes Aircraft Company, Los Angeles, Calif.

[21] Appl. No.: 633,710

[22] Filed: Dec. 21, 1990

[51] Int. Cl.$^5$ .................. G01B 11/26; G01C 15/00
[52] U.S. Cl. ........................... 356/153; 33/286
[58] Field of Search .............. 356/153, 138; 33/286, 33/412, 645; 29/464, 468, 525.1

[56] References Cited

U.S. PATENT DOCUMENTS 4,447,962  5/1984  Grosberg ..................... 33/286

OTHER PUBLICATIONS

"Description of Brunson Alignment Telescopes".

Primary Examiner—F. L. Evans
Assistant Examiner—K. P. Hantis
Attorney, Agent, or Firm—Wanda K. Denson-Low

[57] ABSTRACT

A method is disclosed for accurately aligning a shaft in a hole. One application is disclosed for aligning electromagnetic reflectors. An accurately positioned front surface targeted mirror on a predefined reflector axis is used with a reflected laser beam, optical auto-collimation or auto-reflection using an alignment telescope. The mirror is mounted on one end of a shaft which is inserted into a hole of depth l formed through the reflector at the axis, and has formed thereon a reticle at the shaft axis. By aligning the shaft axis with the hole axis in accordance with the invention, extremely accurate alignment of the reflector can be accomplished.

17 Claims, 4 Drawing Sheets

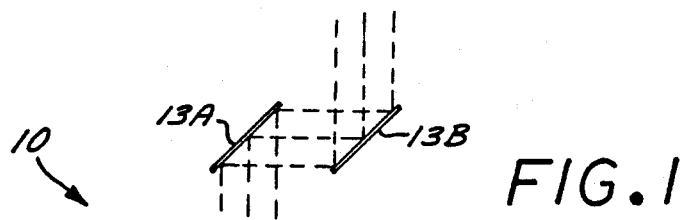
FIG. 1
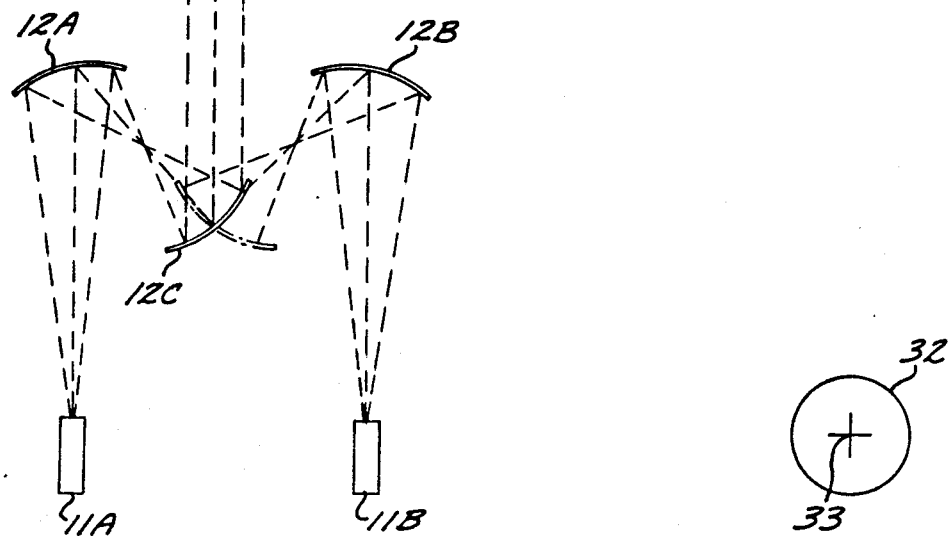
FIG. 2B
FIG. 2A
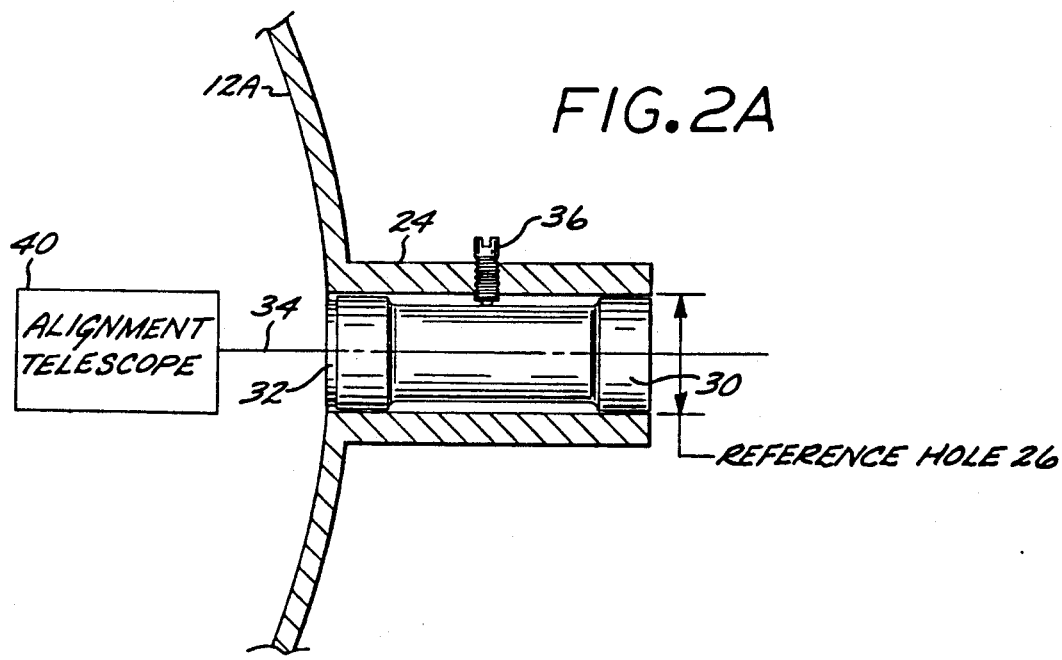

HIGH FREQUENCY REFLECTOR ALIGNMENT METHOD

This invention was made with Government support under Contract No. LC720-AN01 awarded by a government agency. The Government has certain rights in this invention.

BACKGROUND OF THE INVENTION

The present invention relates in general to the alignment of optical devices, and more particularly to a method for precisely aligning single or multiple reflectors used in antenna systems operating at RF or visible light frequencies.

Alignment telescopes are currently used to fix the position of several points on a reflector. These point positions are then used to best fit the theoretical surface contour to the measured points, and then to determine the axis of the reflector by calculations. The alignment telescope is then positioned on this axis to position feeds, subreflectors, or other RF devices. Sometimes lasers are also used. In either case, the process is complex, time consuming, and in many cases impractical.

In cases of small reflectors, collimated light beams are used on an optical bench. However, this technique requires highly reflective surfaces which are both expensive and relatively difficult to achieve while maintaining the required RMS surface accuracy.

Optical antennas have been aligned by measuring the peak radio frequency gain relative to the mounting surface in azimuth and elevation. This is a very inaccurate method, but may be acceptable for some low frequency applications. However, this method is inappropriate for alignment of multiple reflectors, i.e., subreflectors and multiple reflectors associated with beam waveguide systems.

It is therefore an object of the present invention to provide an alignment method permitting very accurate alignment between single or multiple reflectors and feeds in high frequency antenna systems.

SUMMARY OF THE INVENTION

In one general application, the invention provides a method for accurately aligning a shaft in a hole. The method includes the step of inserting the shaft in the hole, and applying a shaft bias force tending to move the shaft off-center within the hole. While the bias force is being applied, a shaft locking force is applied to the shaft which is out-of-plane with respect to the shaft bias force. The shaft will then move to a position determined by the vector sum of the shaft bias and shaft locking force. Thereafter, the bias force is released and the shaft ends will assume a new equilibrium position sliding in the same angular direction. The new equilibrium position will result in a zero angular error if the coefficients of friction at the shaft ends are the same.

A method in accordance with the invention may be used for aligning high frequency reflectors to minimize pointing errors. In one form, the reflector alignment method includes the steps of:

1. forming an opening of depth 1 in the reflector aligned with the nominal center axis of the reflector;
2. determining the lateral and angular offset of the hole axis with the center axis;
3. fabricating a shaft which will slip into the reflector hole with limited clearance, and preparing a mirror surface on one end thereof which is nominally at 90 degrees to the shaft axis;
4. measuring the lateral and angular offset of the mirror from the shaft axis;
5. inserting the shaft into the hole opening;
6. applying a locking force to prevent motion between the shaft and hole during the subsequent alignment procedures; and
7. employing the shaft mirror in conventional alignment procedures such as auto-collimation, autoreflection or laser reflection procedures, in which the errors measured in steps 2 and 4 can be taken into account if necessary for the particular application.

Steps 2 and 4 can be omitted if the additional accuracy is unnecessary for particular applications.

To achieve even greater alignment accuracy, the reflector alignment method can be modified by applying a bias force to the shaft prior to applying the locking force, wherein the bias force is out-of-plane with respect to the locking force. The bias force moves the vertical centerline of the shaft such that, when the bias force is removed, the shaft ends will assume a new position sliding in the same angular direction. The new equilibrium position will result in a zero angular error if the coefficients of friction at the shaft ends are the same.

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 is a simplified schematic diagram of an exemplary antenna system employing multiple reflector elements, to be aligned in accordance with the present invention.

FIG. 2A is a cross-sectional view of a portion of one reflector of the system of FIG. 1; FIG. 2B is a front view showing the installed front surface mirror to be used in the alignment method.

DETAILED DESCRIPTION OF THE PREFERRED EMBODIMENT

Figure 3:
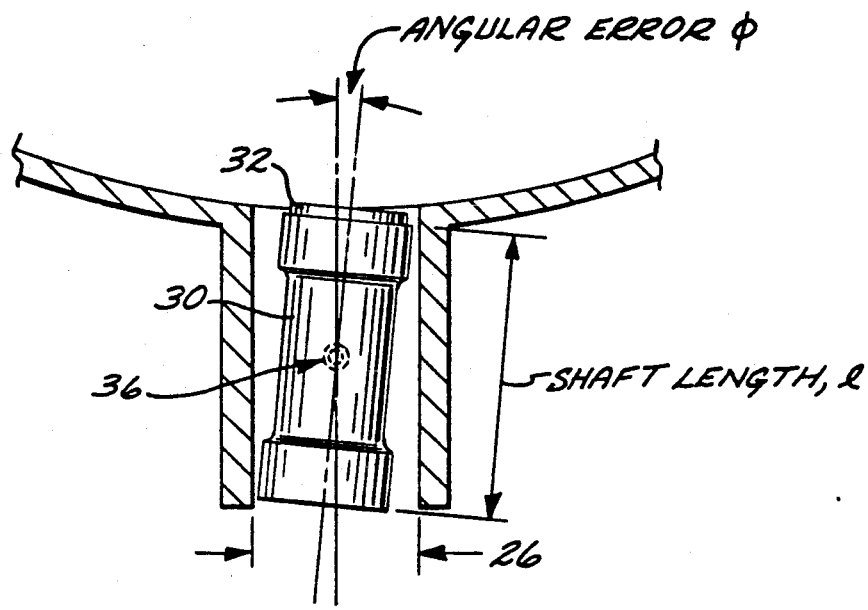
FIG. 3 is an enlarged cross-section illustrative of the possible angular error in the placement of the mirror shaft in the reflector opening.

FIG. 1 illustrates, in simplified schematic crosssectional form, an exemplary antenna system 10 employing a plurality of reflector and feed elements, which may be aligned by the present alignment technique. In this example, the respective feed elements 11A and 11B feed high frequencies electromagnetic energy to respective reflectors 12A and 12B which reflect the energy to reflector 12C. Reflector 12C rotates on an axis that directs energy from either feed to flat reflector 13A. In this example, reflectors 12A-C are elliptical reflectors.

While not shown in FIG. 1, the system 10 will typically include structural elements for securing each reflector in position, and some adjustment means permitting some movement of each reflector during an alignment procedure, and a means for securing the reflector position within this limited range of movement.

The invention can be used to align each of the reflectors of the system 10. FIGS. 2A and 2B illustrates the modification to the reflectors to allow alignment in accordance with the invention. The invention involves the use of a pre-drilled hole 26 in the reflector, here exemplary reflector 12A, to insert a shaft 30 with a front surface mirror 32 bonded normal to the shaft centerline 34 as shown in FIG. 2A. The mirror 32 has defined thereon a reticle 33 as is shown in FIG. 2B centered at the shaft axis. The front surface mirror 32 is then used to reflect images of an alignment telescope 40 by conventional auto-collimation or auto-reflection techniques. As is well known, auto-collimation occurs when the alignment telescope is focused on the reflector surface so that the reflected image of the telescope is exactly in register with its reticle pattern. Auto-reflection occurs when the alignment telescope is focused to reveal the image of the auto-reflection target, and this image registers with the telescope reticle pattern. Reflected laser beams can also be used.

In prior alignment techniques, angular alignment of the mirror surface has been an unknown, causing significant alignment errors if the mirror was not truly oriented at 90° to the reflector axis or central ray. The present invention provides a method for ascertaining the angular orientation of the reflector surface mirror in relation to the reflector axis and, therefore, substantially eliminates or minimizes alignment errors.

The reference hole 26 of depth l is established before or during the fabrication of the reflector surface. For example, a solid boss 24 may be cast as an integral part of the reflector, or may be welded or bonded to the rear surface of the reflector. The center axis, i.e., the axis of rotation, of the parabolic reflector surface is then determined using conventional techniques. Typically, several points are measured and located on the reflector surface away from the axial position. These points and their measured positions are then used to best fit the theoretical parabolic surface contour to the measured points, allowing the position of the center axis to be determined by calculation. The hole 26 is then bored in the reflector and through the boss 24 at this calculated position on the reflector surface. The position of the hole 26 need not be precise, as the error from a lateral offset from the true axis causes only a very small alignment error. Subsequent reflector surface verification measurements are conducted relative to the centerline of the hole 26. Best-fit calculations of the reflector surface may indicate an angular error (due to manufacturing tolerances) of the hole centerline 34. However, this presents no problem as the error magnitude and direction can be considered in subsequent reflector alignment procedures.

The front surface mirror 32 is bonded to the shaft 30 and normal to its centerline 34 using auto-collimation, auto-reflection or laser reflection techniques. The angular error amplitude and direction of the mirror orientation in relation to the shaft axis can then measured and considered in subsequent alignment procedures if desired. For example, the central ray or laser reflected beam on the following reflector target can be offset, knowing the distance between the reflectors and the angular error of the hole and the angular error of the shaft mirror 32. The shaft axis is indicated by a cross-hair reticle 33, which may be used in the subsequent alignment procedures.

As shown in FIG. 2A, the shaft 30 has a cross-sectional dimension in an area intermediate the shaft ends which is reduced in relation to the cross-sectional dimension of the shaft ends. This construction ensures that the contact between the shaft and the wall defining the hole occurs at the shaft ends, and not somewhere intermediate the shaft ends.

Extended analysis and consideration of mirror alignment with the reference hole 26 would be unnecessary if line-to-line contact between the shaft 30 and hole surfaces could be achieved, since true alignment of the mirror with the reflector would then be assured. In some configurations this is possible by light interference tolerancing or heat shrink assembly techniques. However, achieving line-to-line contact is impractical in most cases due to size limitations or the desirability of mirror 32 and shaft 30 removal and ease of assembly. A clearance between the shaft 30 and hole 26 is then necessary. A retaining force supplied by a set screw 36 or other spring loaded device is also necessary to prevent motion between the shaft 30 and hole 26 during subsequent reflector alignment procedures.

Although a single set screw (spherical ended) 36 is shown in FIG. 2, multiple in-line screws may be used to decrease the possibility of the contact torque from cocking the shaft 30 in the hole 21. A spherical ended set screw is used to minimize the twisting force applied to the shaft as the set screw 36 is tightened.

It is recognized that if a shaft-to-hole clearance exists, the hole and shaft centerlines 27 and 32 (FIG. 4) may not be coincident. Angular and lateral translations of the mirror shaft 30 will occur. Maximum lateral translation errors are easily calculated and considered in the final alignment procedure; however, these are typically very small and are generally ignored. The angular errors are not insignificant, and the following error analysis equation should be considered. The angular error $\phi$ is a function of the clearance, C, the length of the mirror shaft, l, and the static coefficient of friction between the mating surfaces.

Figure 4:
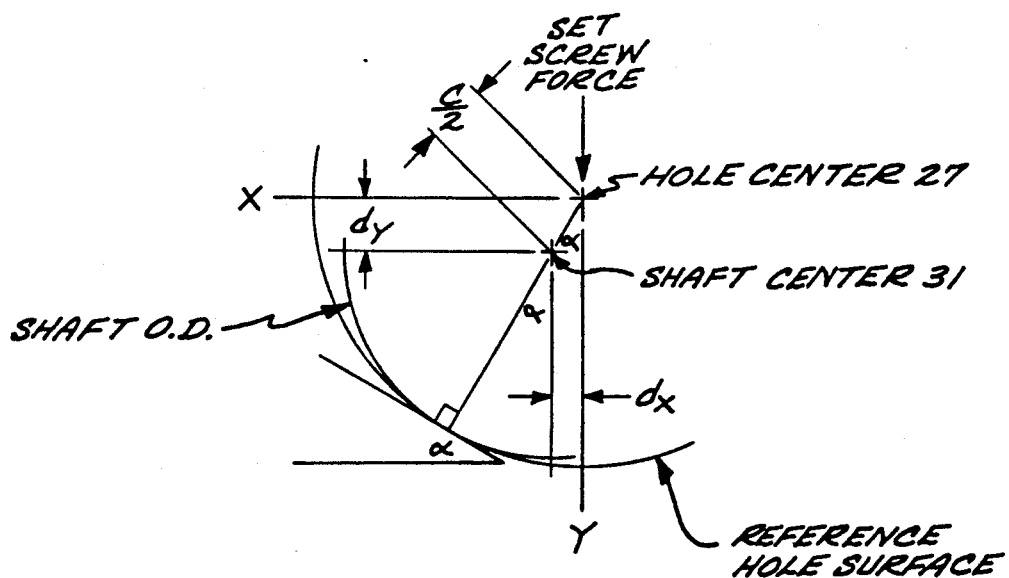
FIG. 4 is an end view illustrative of the mirror shaft in the reflector opening.

Referring to FIGS. 3 and 4, $\alpha$ is the angle determined by a line normal to the curved surfaces at the contact point, $d_x = (c/2) \sin \alpha =$ the shaft end displacement in the x direction; $d_y$ is the shaft end displacement in the y direction. By definition, the static coefficient of friction $\mu = \tan \alpha$. For small angles, $\sin \alpha = \tan \alpha$. Then:

$$\tan \phi = (c \tan \alpha)/l = (c\mu)/l \tag{1}$$

$$d_y = (c/2) \cos \alpha \tag{2}$$

$$\phi = \tan^{-}((c\mu/l)) \text{ in degrees} \tag{3}$$

Figure 5:
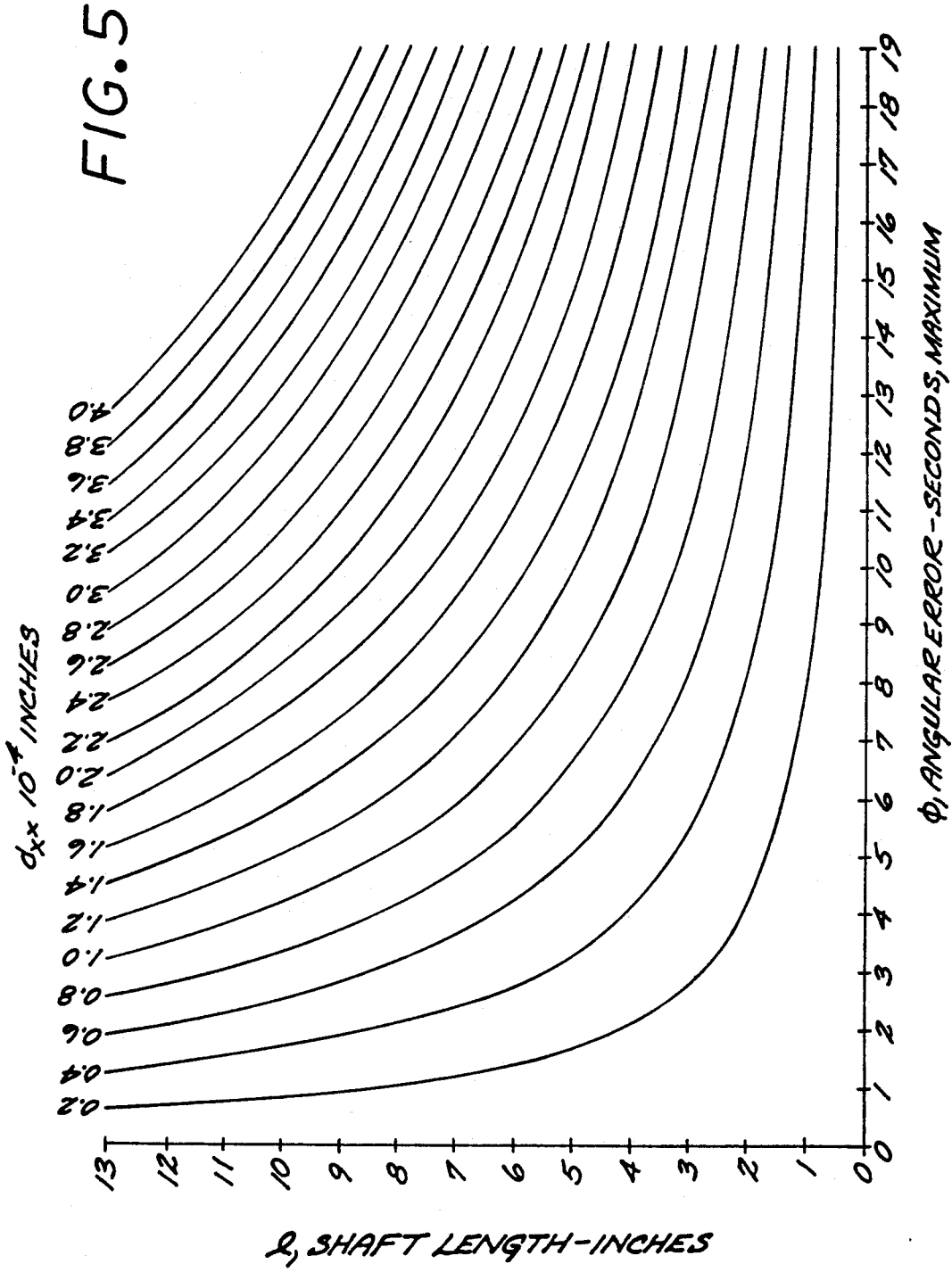
FIG. 5 is a graph illustrating the relationship between the mirror shaft length and the maximum angular error for various values of shaft end displacement.

The maximum angular error defined by equation (3) is graphically depicted by FIG. 5 as a function of the shaft length, and for many values of shaft end displacement $d_x$. It should be noted that there are practical limitations of clearances, i.e., there is danger of shaft seizure or scoring if clearances are too small, for example, less than 0.002 inches, in the case of aluminum on aluminum. The static coefficient of friction, $\mu$, can be reduced by proper selection of contact surface materials and finishes. Also, the contact surfaces can be wet or dry film lubricated. Wet lubricants are generally undesirable due to their affinity for contaminants, causing seizure or scoring. Dry film lubricants containing molybdenum disulfide or polytetrefluorethylene (trademarked Teflon) are considered ideal for reducing the static coefficient of friction. Therefore, due to practical limitations above, $d_x$ is limited to values over approximately 0.001 inch. Also, due to the asymptotic characteristic of the length function in equation (3) and depicted in FIG. 5, lower maximum shaft angle errors are limited to 5 to 10 arc second ranges. In most cases of RF reflector alignment, this error will be considered adequate. It should be noted at this point that the best alignment telescopes available today cannot resolve much better than 4 arc seconds.

To align a reflector in accordance with the generalized system described above includes the following steps:

1. forming an opening of depth l in the reflector aligned with its nominal center axis;
2. determining the lateral and angular offset of the hole axis with the center axis;
3. fabricating a shaft which will slip into the reflector hole with limited clearance, and preparing a mirror surface on one end thereof which is nominally at 90° to the shaft axis;
4. measuring the lateral and angular offset of the mirror from the shaft axis;
5. inserting the shaft into the hole opening;
6. applying a locking force to prevent motion between the shaft and hole during the subsequent alignment procedures;
7. employing the shaft mirror in conventional alignment procedures such as auto-collimation, autoreflection or laser reflection procedures, in which the errors measured in steps 2 and 4 can be taken into account if necessary for the particular application (if unnecessary, steps 2 and 4 can be omitted). During this step the position of the reflector is adjusted to its aligned position and secured in place.

In systems involving millimeter through visible light frequencies or beam waveguides (multiple series reflectors), much greater accuracies than 5 to 10 arc seconds will be necessary. To achieve this accuracy, a variation of the basic approach described above can be utilized.

Figure 6A:
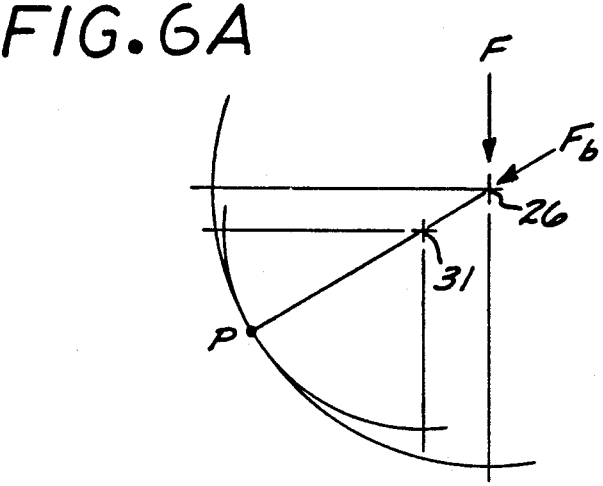
FIGS. 6A–6C illustrate the principle of operation of a modified method of aligning a shaft with a hole center in accordance with the invention.
Figure 6B:
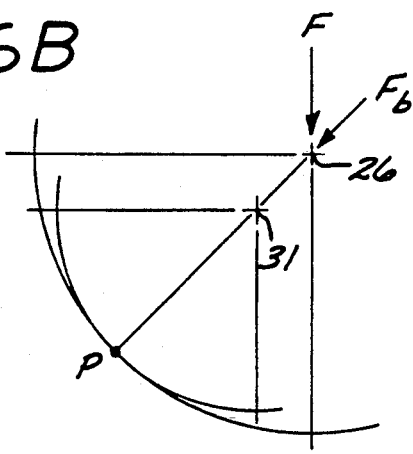

Referring to FIGS. 6A and 6B, the method involves moving the vertical centerline 31 of the shaft by imposing an initial bias force, $F_b$, prior to imposing the shaft locking force F (e.g., by the shaft locking screw similar to screw 36 of FIG. 2A) as shown in FIGS. 5A and 5B. This biasing force need not be greater than the shaft weight but must be out-of-plane with the final shaft locking force F; i.e, the biasing set screw must not be in the same plane determined by the hole centerline and the locking screw axis. The bias set screw should be disposed between 5° and 85° from the locking screw, say about 45°. After the biasing force has been applied, the final positioning force is applied. The resultant shaft force will then be the vector sum and the maximum shaft error $\phi$ will be as defined by equations (1–3).

When the initial biasing force is removed, the shaft ends will assume a new position sliding in the same angular direction (Point P in FIGS. 6A–6B). This new equilibrium position will result in a zero angular error if the coefficient of friction at the shaft ends are the same. This is true because the final resting points of the shaft ends are determined by the coefficients of friction between the contacting surfaces only. If the coefficients of friction are not the same, then the error angle is:

$$\phi = \tan^{-1}[(c/2l)(\mu_1 - \mu_2)], \qquad (4)$$

where $\mu_1$ = maximum coefficient of friction, and $\mu_2$ = minimum coefficient of friction.

Conservatively, the maximum variation in the coefficient of friction between similar surfaces machined at the same time should not exceed 15%. The above error equation then becomes:

$$\phi = \tan^{-1}[0.075c\mu_1/l] \qquad (5)$$

By dividing equation (3) by equation (5), it is apparent that at least an order of magnitude decrease in angular error will result (physical dimensions and static coefficient of friction being identical). Using the bias method of shaft installation and by careful selection of materials and design configuration, maximum angular errors less than one arc second can be achieved (0.31 inches one mile away subtends an angle of one arc second).

Figure 7:
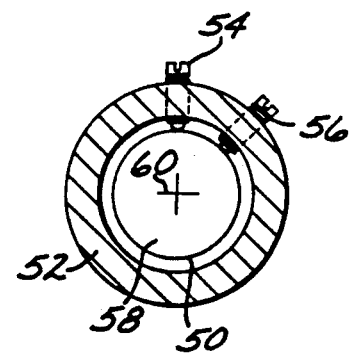
FIG. 7 illustrates an end view of a shaft and hole arrangement employing an offset bias screw and a shaft locking screw in accordance with a modified alignment method.
Figure 6C:
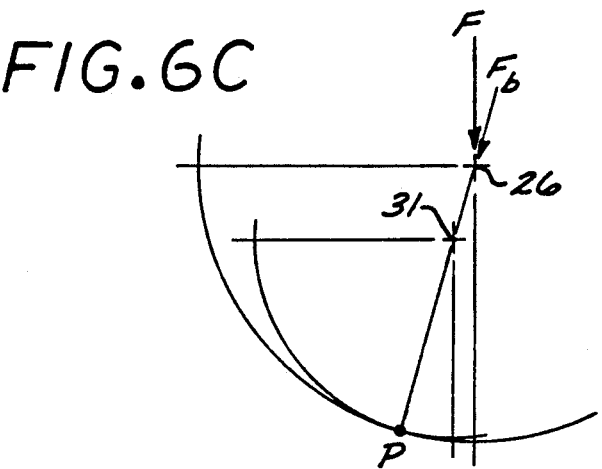

FIG. 7 illustrates how the modified method may be implemented, showing a shaft 50 inserted in hole 52. Two spherical set screws 54 and 56 can be tightened against the shaft 50 to exert the respective bias and locking forces. A mirror 58 with centered reticle 60 is positioned on the shaft end.

To align a reflector in accordance with the modified system described above includes the following steps, many of which are in common with the generalized method described above:

1. forming an opening of depth l in the reflector aligned with its nominal center axis;
2. determining the lateral and angular offset of the hole axis with the reflector axis:
3. fabricating a shaft which will slip into the reflector hole with limited clearance, and preparing a mirror surface on one end thereof which is nominally at 90 degrees to the shaft axis;
4. measuring the lateral and angular offset of the mirror from the shaft axis;
5. inserting the shaft into the hole opening;
6. applying a shaft bias force against the shaft;
7. applying a shaft locking force against the shaft which is out of plane with the bias force;
8. releasing the bias force so that the contact points at the shaft end will slide in the same angular direction.
9. employing the shaft mirror in conventional alignment procedures such as auto-collimation, autoreflection or laser reflection procedures to align the reflector.

While the invention has been described in the context of a method for aligning a reflector, it will be appreciated that the invention has broad application, in a general sense to align a shaft in a hole.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for accurately aligning a shaft having a center longitudinal axis in a hole, comprising a sequence of the following steps:
    disposing said shaft in said hole, said shaft being characterized by first and second ends, and by a reduced cross-sectional dimension in an area extending between said ends in relation to the cross-sectional dimension of the shaft at said first and second ends, wherein said shaft may contact the wall defining said hole only at said first and second shaft ends;

applying a shaft bias force tending to move the axis of the shaft in the hole;

applying a shaft locking force to said shaft which is out-of-plane with respect to said bias force;

releasing said bias force while maintaining said locking force;

whereby said shaft will move to an equilibrium position resulting in zero angular error of the shaft relative to the hole if the coefficients of friction between the shaft ends and a corresponding surface of the hole are the same.

2. The method of claim 1 wherein said bias force is applied to said shaft at an angle in the range of 5 degrees to 85 degrees with respect to said shaft locking force.

3. A method of aligning a reflector having a center axis, comprising a sequence of the following steps:

forming a cylindrical hole of depth l in the reflector, said hole having a longitudinal nominally axis aligned with the reflector center axis;

inserting a shaft having a center axis into said hole, said shaft being fabricate to slip into the reflector hole with a limited clearance, having a mirror surface on one end thereof disposed at a 90 degree angle to the shaft axis, said mirror having defined thereon a reticle centered on the shaft axis;

employing the shaft mirror surface and reticle in a conventional aligning procedure to align the position of the reflector.

4. The method of claim 3 further comprising the step of measuring the angular offset of the mirror reticle from the shaft axis, and wherein the step of employing the shaft mirror and reticle in an aligning procedure takes into account said angular offset of the mirror reticle.

5. The method of claim 3 further comprising the step of determining the angular offset of the hole axis from the center axis of the reflector, and wherein said step of employing the shaft mirror and reticle in an aligning procedure takes into account said angular offset of the hole axis.

6. The method of claim 3 further comprising the step of applying a locking force to prevent motion between the shaft and hole during said aligning procedure.

7. The method of claim 6 further comprising the steps of applying a shaft bias force tending to move the center axis of the shaft in the hole prior to applying said locking force, and wherein said bias force is out-of-plane with respect to said locking force, and releasing said bias force after said locking force has been applied, wherein the shaft will move to an equilibrium position resulting in zero angular error of the shaft relative to the hole if the coefficients of friction between the shaft ends and the corresponding surfaces of the hole are the same.

8. The method of claim 6 wherein said step of applying a locking force comprises tightening a spherica-lended set screw against said shaft.

9. The method of claim 3 wherein said shaft is characterized by first and second ends, and by a reduced cross-sectional dimension in an area extending between said ends in relation to the cross-sectional dimension of the shaft at said first and second ends, wherein said shaft contacts the wall defining said hole only at said first and second shaft ends.

10. The method of claim 7 wherein said bias force is applied to said shaft at an angle in the range of 5 degrees to 85 degrees with respect to said shaft locking force.

11. A method for aligning a reflector, said reflector having a center axis and having a structural boss defined behind the center of the reflector surface, comprising a sequence of the following steps:

forming a hole of depth l and having a center axis in the reflector surface and said boss at the center axis of the reflector;

inserting a shaft having a center axis into said hole in the reflector surface, said shaft having a mirror at the reflector surface end thereof disposed perpendicular to the shaft center axis, said mirror having a reticle defined thereon and centered at the shaft center axis, said shaft center axis aligned with the center axis of the hole; and using the shaft mirror as a reference point to align the angular position of the reflector.

12. The method of claim 11 wherein said hole is characterized by a diameter which is slightly larger than the outer diameter of said shaft, whereby a clearance c is defined between the shaft and the structure walls defining said hole.

13. The method of claim 12 further comprising the step of applying a retaining force against said shaft when inserted in said hole to prevent motion between said shaft and said hole.

14. The method of claim 13 further characterized in that the maximum angular error $\phi$ in the position of the shaft mirror is determined by the relationship $$\phi = \tan^{-1}((c\mu)) \text{ in degrees,}$$

where c is the clearance, $\mu$ is the static coefficient of friction between the mating surfaces of the shaft and hole.

15. The method of claim 13 wherein said step of applying a retaining force comprises tightening a spherical-ended set screw against the shaft.

16. The method of claim 11 wherein said shaft is characterized by first and second ends, and by a reduced cross-sectional dimension in an area intermediate said shaft ends in relation to the cross-sectional dimension of the shaft at said first and second ends, wherein said shaft contacts the wall defining said hole only at said first and second shaft ends.

17. The method of claim 11 wherein a bias force is applied to said shaft at an angle in the range of 5 degrees to 85 degrees with respect to a shaft locking force.

* * * * *